United States Patent [19]

Friedl

[11] Patent Number: 5,793,589
[45] Date of Patent: Aug. 11, 1998

[54] CIRCUIT ARRANGEMENT FOR CURRENT LIMITING

[75] Inventor: Karl Friedl, Augsburg, Germany

[73] Assignee: Siemens Aktiengesellschaft, Munich, Germany

[21] Appl. No.: 737,994

[22] PCT Filed: May 29, 1995

[86] PCT No.: PCT/EP95/02036

§ 371 Date: Dec. 2, 1996

§ 102(e) Date: Dec. 2, 1996

[87] PCT Pub. No.: WO95/33295

PCT Pub. Date: Dec. 7, 1995

[30] Foreign Application Priority Data

Jun. 1, 1994 [DE] Germany ............. 94108488.1

[51] Int. Cl.[6] ................................. H02H 9/00
[52] U.S. Cl. ...................... 361/58; 361/101; 307/131
[58] Field of Search ............... 361/18, 58, 87, 361/93, 100, 101, 159; 307/130, 131

[56] References Cited

U.S. PATENT DOCUMENTS 4,438,473  3/1984  Cawley et al. .......................... 361/18
4,939,776  7/1990  Bender ................................. 379/382
5,347,169  9/1994  Preslar et al. ........................ 307/246
5,539,820  7/1996  Pistilli ................................ 379/412

FOREIGN PATENT DOCUMENTS 3535864  4/1987  Germany.

Primary Examiner—Jeffrey A. Gaffin
Assistant Examiner—Michael J. Sherry
Attorney, Agent, or Firm—Hill & Simpson

[57] ABSTRACT

Circuit arrangement for current limiting, which contains, in a series path, the source-drain path of a field-effect transistor (12) and a current sensor (8) connected in series therewith. In order to achieve effective protection against momentary overcurrents, the rate of rise of the current is limited with the aid of an inductor (9) contained in the current sensor (8). A diode (11) acting as a freewheeling diode is arranged in parallel with the current sensor (8). The circuit arrangement can advantageously be used in apparatuses for supplying power to electrical telecommunications equipment.

10 Claims, 2 Drawing Sheets

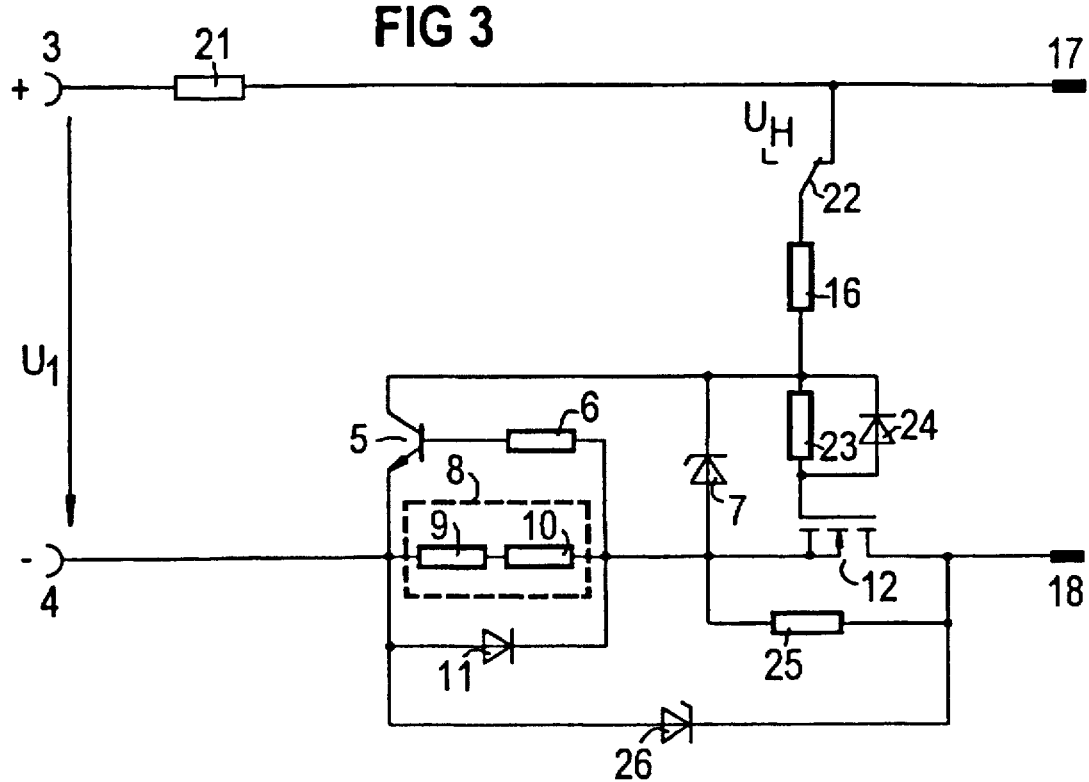
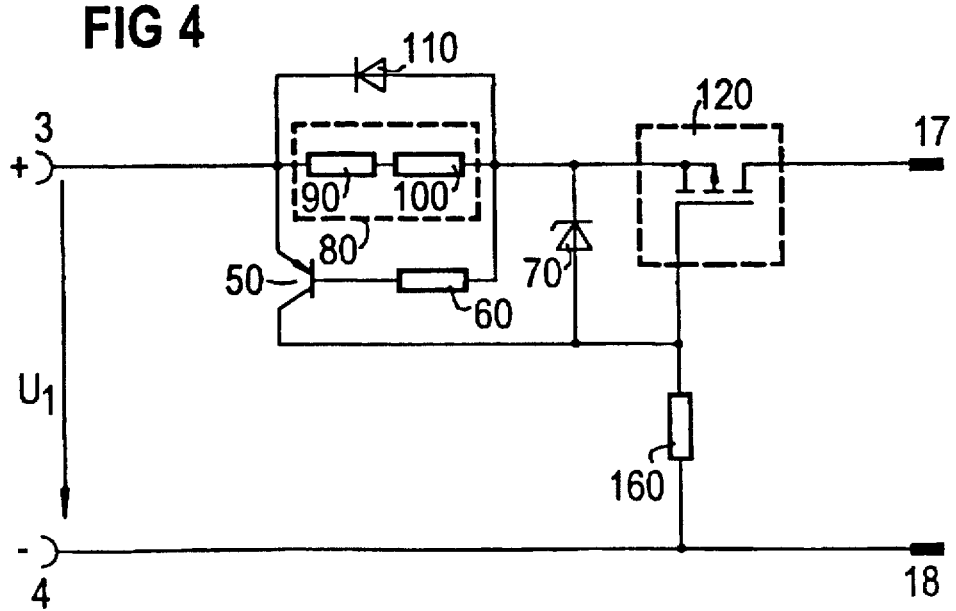

CIRCUIT ARRANGEMENT FOR CURRENT LIMITING

BACKGROUND OF THE INVENTION

1. Field of the Invention

The present invention relates to a circuit arrangement for current limiting which is arranged between a supply voltage source and a storage capacitor and contains, in a series path, the source-drain path of a field-effect transistor and a current sensor connected in series with the source-drain path, the gate of the field-effect transistor being connected via a resistor to a turn-on potential, which switches the field-effect transistor on, and via the emitter-collector path of a transistor to a blocking potential, which switches the field-effect transistor into the off state, the emitter of the transistor being connected to one end of the current sensor and the base of the transistor being connected via a resistor to the other end of the current sensor, with the result that the emitter-collector path of the transistor has a high impedance in the event of voltage drops across the current sensor below a predetermined threshold voltage, and, in the event of voltage drops across the current sensor above the predetermined threshold voltage, the collector of the transistor emits a potential which controls the field-effect transistor in the sense of current limiting.

2. Description of the Related Art

A circuit arrangement of this type has already been disclosed in the German Patent Document DE-35 35 864-A1. The drain-source path of a field-effect transistor is arranged in the series path of the known circuit arrangement. A measuring resistor is connected as a current sensor in series with the drain-source path of the field-effect transistor. The voltage drop across the measuring resistor controls a bipolar transistor. The gate of the field-effect transistor is connected both via a resistor to a turn-on potential, which switches the field-effect transistor on, and via the emitter-collector path of the bipolar transistor to a blocking potential, which switches the field-effect transistor off. With the aid of the field-effect transistor, a charging current, which flows after the power supply voltage has been turned on and which charges a capacitor, is limited to a predetermined value.

In the case of assemblies having a capacitor connected in parallel with the input or output, high charging currents occur in the event of live plugging or when a voltage is connected to the capacitor. This is the case, in particular, when assemblies which have buffer capacitors for the power supply are plugged during operation onto printed circuit boards with voltage-carrying bus lines of low impedance. Such buffer capacitors may be present, in particular, at the input of switched-mode power supply devices or at outputs of power surely devices which are connected in parallel with one another for the purpose of the redundant feeding of loads.

With the aid of a circuit arrangement for current limiting having a field-effect transistor and a current measuring resistor, it is possible to limit the charging current in the event of plugging or the application of the operating voltage, and also during operation. However, this limiting has a typical reaction time of a few microseconds. If assemblies are withdrawn during operation, then brief recharging current pulses, which reach a multiple of the steady-state limit value, can occur due to bouncing of the plug contacts. This can bring about interference particularly in telecommunications arrangements situated on adjacent assemblies.

SUMMARY OF THE INVENTION

Considerations within the context of the present invention have revealed that the abovementioned difficulties do not arise when, instead of limiting the current itself, the very rate of rise of the current is limited.

An object of the invention, therefore, is to provide a circuit arrangement in such a way that it effectively limits not only the current, but also the rate of rise of the current.

According to the invention, the circuit arrangement is for current limiting, which is arranged between a supply voltage source and a storage capacitor and contains, in a series path, the source-drain path of a field-effect transistor and a current sensor connected in series with the source-drain path, the gate of the field-effect transistor being connected via a resistor to a turn-on potential, which switches the field-effect transistor on, and via the emitter-collector path of a transistor to a blocking potential, which switches the field-effect transistor into the off state, the emitter of the transistor being connected to one end of the current sensor and the base of the transistor being connected via a resistor to the other end of the current sensor, with the result that the emitter-collector path of the transistor has a high impedance in the event of voltage drops across the current sensor below a predetermined threshold voltage, and, in the event of voltage drops across the current sensor above the predetermined threshold voltage, the collector of the transistor emits a potential which controls the field-effect transistor in the sense of current limiting, the current sensor containing an inductor, with the result that the impedance of the sensor has a resistive and an inductive component, and a diode which is reverse-biased with regard to the load current being arranged in parallel with the current sensor.

These measures yield the advantage that the limiting effect starts virtually without delay, thereby achieving effective protection against momentary overcurrents during the plugging of an assembly unit or when an arrangement having a storage capacitor is turned on. It is particularly advantageous here that even switching operations which take place in relatively brief succession, such as are caused, in particular, by contact bounce, or overvoltage pulses cannot effect any damaging momentary overcurrents. In addition, the limited rate or rise reduces interference effects on electrically conductively connected or spatially adjacent circuits. The circuit arrangement is therefore particularly suitable for use in electrical telecommunications equipment which impose stringent requirements on avoiding interference effects.

When assemblies are exchanged during operation, assemblies placed onto the same printed circuit board are not subjected to interference by high charging currents, since the circuit arrangement for current limiting also limits, in a defined manner, momentary charging currents during contact bounce both in the event of plugging and in the event of withdrawing of the assemblies.

Moreover, the circuit arrangement prevents possible damage of plug contacts due to overcurrent. The limiting of the charging current also ensures that the voltage rise across the storage capacitor in the event of overvoltages occurring during operation is likewise limited. The triggering of back-up fuses during turn-on, plugging or in the event of voltage fluctuations during operation is also effectively prevented.

The U.S. Pat. No. 4,438,473 has already disclosed a circuit arrangement which is used for the feeding of an electrical load and provides an interruption of the load current in the event of short circuit. A bipolar transistor which is arranged in the series path of the circuit arrangement and is switched on during normal operation is transferred to the off state in the event of any short circuit with the aid of a current sensor. The current sensor comprises a measuring resistor with an inductor arranged in series with the measuring resistor. The transistor, which serves as an interrupter, is controlled by a flip-flop and therefor operates in a binary manner. The output signal of the flip-flop is delayed on its way to the transistor, serving as interrupter, during turn-on, in order to permit the operation of the interrupter in connection with a capacitive load. Customary thyristors are used for protection against overvoltages on the input side.

Advantageous refinements of the invention are provided by a gate series resistor arranged in the gate supply line of the field-effect transistor, and a diode connected in parallel with the gate series resistor and is reverse-biased with regard to the voltage which effects a voltage drop across the gate series resistor and switches the field-effect transistor on. The circuit arrangement has a Z diode (zener diode) which is reverse-biased with regard to the voltage which switches the field-effect transistor on is arranged between the collector of the transistor and the source of the field-effect transistor. The turn-on potential can be changed over with the aid of a switch between the potential of a direct connection between the supply voltage source and load, on the one hand, and an auxiliary potential.

Preferably, a resistor is arranged in parallel with the drain-source path of the field-effect transistor. A Z diode which is reverse-biased for the supply current is arranged in parallel with the series circuit comprising the current sensor and the drain-source path of the field-effect transistor.

In a circuit arrangement of the invention, the inductance of the inductor is rated such that when the circuit arrangement in the passive state is turned on, the main component of the charging current of the parasitic capacitances of the field-effect transistor flows via the emitter-collector path of the transistor. The resistive component of the current sensor is rated such that the load current, in connection with the threshold voltage of the transistor, is limited to a predetermined value. According to the present invention, the resistor situated in the base supply line of the transistor has a rating which is small enough as regards charging of the parasitic capacitances of the field-effect transistor and large enough as regards the protection of the transistor against overloading. The circuit arrangement has the resistive components of the current sensor formed by the winding resistance of the inductor.

DESCRIPTION OF THE DRAWINGS

The invention is explained in more detail using the exemplary embodiments illustrated in the figures, in which FIG. 3 is a circuit diagram which shows a circuit arrangement for current limiting having an additionally controllable field-effect transistor, and FIG. 4 is a circuit diagram which shows a circuit arrangement for current limiting having a p-channel field-effect transistor and an npn transistor.

DESCRIPTION OF THE PREFERRED EMBODIMENTS

Figure 1:
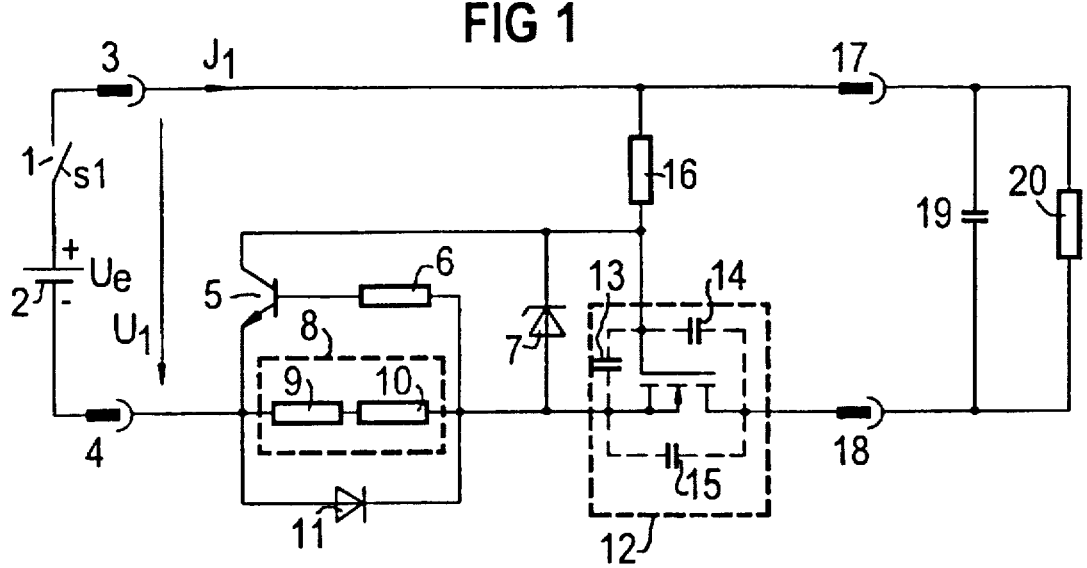
FIG. 1 is a circuit diagram which shows a circuit arrangement for current limiting having an n-channel field-effect transistor and an npn transistor.

The circuit arrangement shown in FIG. 1 contains a device for current limiting which is arranged between the supply voltage source 2 and the storage capacitor 19 and simultaneously serves for inrush current limiting and for overvoltage protection.

The circuit arrangement for current limiting can be connected to the supply voltage source 2 via the plug contacts 3 and 4 of a multiway connector (not illustrated in any more detail in the figure) and to an electrical load, which is illustrated as a parallel circuit formed by the storage capacitor 19 and the load resistor 20, via the plug contacts 17 and 18.

The storage capacitor 19 is connected at one end to the positive pole of the supply voltage source 2 via the plug contacts 17 and 3, and at the other end to the negative pole of the supply voltage source 2 via the plug contact 18, the drain-source path of the field-effect transistor 12, the current sensor 8 connected in series therewith and the plug contact 4.

The current sensor 8 comprises the current measuring resistor 10 and the inductor 9 which is arranged in series therewith. The diode 11, which is reverse-biased with regard to the load current and acts as a freewheeling diode for the inductor 9, is connected in parallel with the current sensor 8.

The gate of the field-effect transistor 12, which serves as an actuator, is connected, on the one hand, to the collector of the bipolar transistor 5 and, on the other hand, via the resistor 16 to the series path of the circuit arrangement, which series path connects the positive pole of the supply voltage source 2 to the load 19 and 20. The Z diode 7, which is a zener diode is connected in parallel with the gate-source path of the field-effect transistor 12. The Z diode 7 is biased in such a way that it limits the voltage which switches the field-effect transistor 12 on to the value of its Zener voltage.

The emitter of the bipolar transistor 5 is connected via the plug contact 4 to the negative pole of the supply voltage source 2. The collector of the transistor 5 is connected to the gate of the field-effect transistor 12. The base of the transistor 5 is connected via the resistor 6 to the junction point between the current sensor 8 and the source of the field-effect transistor 12.

As a result of the current-limiting effect of the circuit arrangement, the high but brief overvoltages which occur in supply systems lead only to a small rise in the voltage across the load 20. The voltage difference is present at the field-effect transistor 12, which is rated for this voltage. After the end of the overvoltage, the circuit arrangement returns to the normal state with the field-effect transistor 12 fully turned on.

The current $J_1$ to be limited flows from the positive pole of the input source 2 via the closed switch 1, the parallel circuit formed by the capacitor 19 and the resistor 20, the drain-source path of the field-effect transistor 12 and the current sensor 8 to the negative pole of the voltage source 2.

The rate of rise of the current $J_1$ is measured by means of the inductor 9 and limited with the aid of the field-effect transistor 12. The necessary inductance of the inductor 9 is, depending on the ratio of the voltage to be limited and the measurement voltage, of orders of magnitude less than the value which would be necessary if the inductor itself had to limit the current rise.

The charging current $J_1$ always occurs when the capacitor 19 is connected to the supply voltage Ue due to closing of the switch 1 with connected plug contacts 3, 4 and 17, 18 or due to plugging of these contacts with the switch 1 closed.

The current limiting is effected by means of the field-effect transistor 12, which is a normally off n-channel MOSFET and is arranged in series with the capacitive load 19 and 20. The field-effect transistor 12 has parasitic capacitances. The gate-source capacitance 13 lies between the gate and the source, the gate-drain capacitance 14 between the gate and the drain and the source-drain capacitance 15 between the source and the drain of the field-effect transistor 12.

With an applied voltage $U_1$ the field-effect transistor 12 is turned on via the high-value resistor 16. The Z diode 7 limits the drive voltage and therefore serves for the protection of the field-effect transistor 12.

The resistor 10 and the winding resistance of the inductor 9 form the resistive component of the current sensor 8. If appropriate, the winding resistance of the inductor 9 alone can form this resistive component, in which case the external resistor 10 is to be replaced by a short circuit.

If the voltage generated across the inductor 9 and resistor 10 by the rise in the charging current and the charging current itself exceeds the base threshold voltage of the transistor 5, the transistor 5 is switched on and begins to switch the field-effect transistor 12 off. In this way, both the rise in the charging current $J_1$ and the charging current $J_1$ itself are limited.

Figure 2:
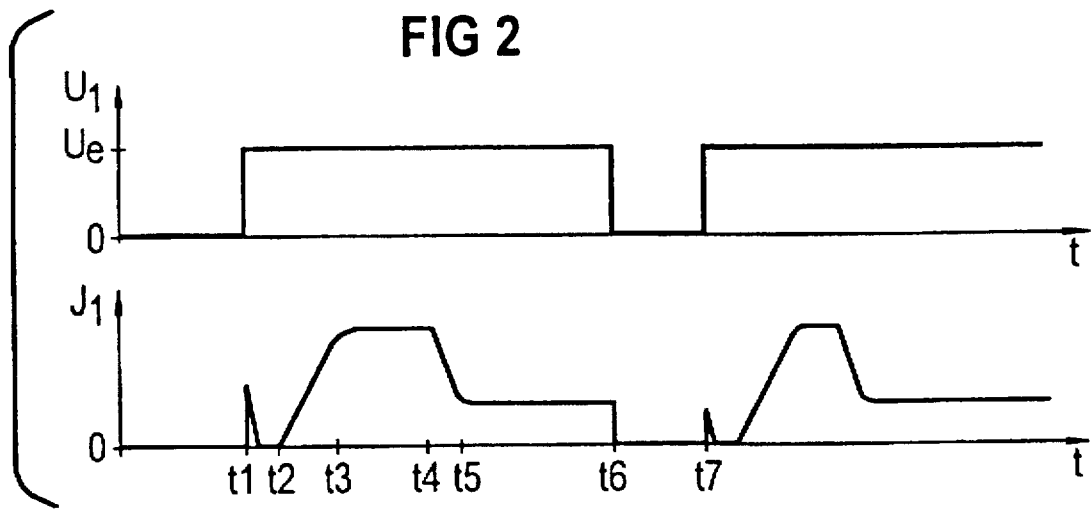
FIG. 2 shows a current timing diagram and a voltage timing diagram for the circuit arrangement according to FIG. 1.

FIG. 2 shows the profile of the charging current $J_1$ for the circuit arrangement according to FIG. 1 in the event of the application of the voltage $U_1$ and in the event of contact bounce, while taking account of the parasitic capacitances 13, 14 and 15 of the field-effect transistor 12.

At the turn-on instant t1, the voltage $U_1$ leaps from zero to the value Ue. Owing to the capacitor 19, which is discharged at this instant, and the parasitic capacitances 13 to 15 of the field-effect transistor 12, the voltage across the inductor 9 and the voltage between the collector and emitter of the transistor 5 thus also leap to the value of the input voltage Ue. Base current flows into the transistor 5 via the resistor 6, with the result that the transistor 5 turns on and takes over the current for charging the parasitic capacitances 13 and 14 and, via the Z diode 7, also the current for charging the parasitic capacitance 15.

The resistor 6 is rated in such a way that, on the one hand, sufficient base current is available for rapid charging of the parasitic capacitances 13 to 15 and, on the other hand, the transistor 5 is not over-loaded.

The inductance of the inductor 9 is expediently so large that the main component of the charging current of the parasitic capacitances 13 to 15 does not flow via the inductor 9, but rather via the transistor 5. The effect achieved by this is that the transistor 5 reliably switches the field-effect transistor 12 off via the gate thereof. In FIG. 2, this charging current can be recognized as a brief spike at the instant t1.

The transistor 5 switches off after the charging current of the parasitic capacitances 13 to 15 has decayed. The field-effect transistor 12 is then turned on again via the resistor 16, with the result that at the instant t2, the charging current for the capacitor 19, which forms the load capacitance, begins to flow. The rate of rise of the current $J_1$ is limited by the inductance of the inductor 9, in conjunction with the base threshold voltage of the transistor 5. Starting from the instant t3, the voltage drop across the resistor 10 reaches the base threshold voltage of the transistor 5, with the result that the current $J_1$ does not rise any further. At the instant t4, the capacitor 19 is almost charged as the charging current $J_1$ begins to drop. At the instant t5, the capacitor 19 is fully charged, with the result that only the current received by the non-reactive resistor 20 of the capacitive load 19 and 20 now flows.

At the instant t6, a brief interruption of the voltage $U_1$ begins, for example as a result of bouncing of the plug contacts 3 and/or 4. During this interruption, the capacitor 19 is partially discharged by the resistor 20. The voltage $U_1$ is restored at the instant t7. The current profile starting from the instant t7 corresponds to the behavior starting from the instant t1, the duration of the charging operation being shorter depending on the charge state of the capacitor 19 at the instant t7. In this case, the current limiting starts without delay and without spikes exceeding the normal limit value even when the parasitic capacitances 13 to 15 of the field-effect transistor 12 are still not completely discharged.

FIG. 3 shows a circuit arrangement for current limiting which largely corresponds to the circuit arrangement according to FIG. 1. The resistor 23 is additionally provided between the junction point between the collector of the transistor 5 and the resistor 16, on the one hand, and the gate of the field-effect transistor 12, on the other hand. The diode 24 is connected in parallel with the resistor 23. The diode 24 is reverse-biased with regard to the voltage which is fed via the resistor 16 and switches the field-effect transistor 12 on. The Z diode 7 connected between the collector of the transistor 5 and the source of the field-effect transistor 12 is in this case connected in parallel with the series circuit comprising the resistor 23 and the gate-source path of the field-effect transistor 12.

The resistor 23 may be necessary for the suppression of oscillations in some types of field-effect transistors, particularly in connection with relatively long gate supply lines. The diode 24 prevents the field-effect transistor 12 from being driven high via the parasitic drain-source capacitance 15 at the turn-on instant (see FIG. 1).

The switch 22 constitutes a further supplementation to the circuit arrangement according to FIG. 1. The switch 22 permits the turn-on potential connected to the resistor 16 to be changed over. In the switch position illustrated, the input voltage $U_1$ passes to the resistor 16. In the other switch position, the auxiliary voltage $U_H$ is connected to the resistor 16.

The resistor 16 is connected between the switch 22 and the resistor 23. The junction point between the resistors 16 and 23 is connected to the collector of the transistor 5 and, via the Z diode 7, to the source of the field-effect transistor 12. The Z diode 7 is biased in such a way that it is reverse-biased with regard to the voltage passing to its cathode from the switch 22 via the resistor 16, and therefore limits this voltage to the value of its Zener voltage.

If the resistor 16 is connected to the auxiliary voltage $U_H$ via the switch 22, then the drive voltage for the field-effect transistor 12 is derived from the auxiliary voltage $U_H$. In this way, the field-effect transistor 12 can be switched independently of the supply voltage $U_1$. As a result, the field-effect transistor 12 can be used as an actuator for additional functions such as overvoltage disconnection or a defined turn-on order of different loads.

A further supplementation to the circuit arrangement according to FIG. 1 consists in the fact that the resistor 25 is arranged in parallel with the drain-source path of the field-effect transistor 12 and the Z diode 26 is connected in parallel with the series circuit comprising the current sensor 8 and the drain-source path of the field-effect transistor 12. The Z diode 26 is reverse-biased with regard to the current 11. The resistor 25 serves as a load-relief resistor for reducing the pulse loading of the field-effect transistor 12, or serves, when the resistor 16 is connected to the auxiliary voltage $U_H$, to supply the load with a small current, for example as auxiliary supply, even in the switched-off state of the field-effect transistor 12, or serves slowly to charge the capacitor 19 even before the field-effect transistor 12 is turned on.

The Z diode 26 serves for the protection of the field-effect transistor 12 against overvoltages and against inverse currents. It is unnecessary if the field-effect transistor 12 itself has a defined avalanche behavior.

The inductor 21 is used, in particular, when the current spike occurring at the instant t1, according to FIG. 2, during charging of the parasitic capacitances 13 to 15 is to be attenuated even further. A relatively small inductance is sufficient in this case.

According to FIG. 1, a MOS-FET is used as the field-effect transistor 12 and a bipolar transistor of the npn type is used as the transistor 5. The circuit arrangement for current limiting according to FIG. 4 is produced from the circuit arrangement according to FIG. 1 in that a p-channel MOS-FET is used instead of an n-channel MOS-FET for the field-effect transistor 12 and a pnp transistor is used instead of an npn transistor for the transistor 5, and in that the series circuit formed by the drain-source path of the field-effect transistor 12 and the current sensor 8 is connected to the positive pole of the supply voltage source instead of the negative pole.

Although other modifications and changes may be suggested by those skilled in the art, it is the intention of the inventor to embody within the patent warranted hereon all changes and modifications as reasonably and properly come within the scope of his contribution to the art.

I claim:

1. A circuit arrangement for current limiting, which is arranged between a supply voltage source and a storage capacitor, comprising:

a field-effect transistor having a source-drain path and a gate;

a current sensor connected in series with the source-drain path, a resistor connected between the gate of the field-effect transistor and a turn-on potential from said supply voltage source, which switches the field-effect transistor on, and a second transistor having its emitter-collector path connected between said gate of said field-effect transistor and a blocking potential of said supply voltage source which switches the field-effect transistor into an off state, the emitter of the second transistor being connected to one end of the current sensor, a resistor connected between a base of said second transistor and the current sensor with a result that the emitter-collector path of the transistor has a high impedance in an event of voltage drops across the current sensor below a predetermined threshold voltage, and, in an event of voltage drops across the current sensor above the predetermined threshold voltage, the collector of the transistor emits a potential which controls the field-effect transistor for in the sense of current limiting, the current sensor including an inductor with a result that impedance of said current sensor has a resistive and an inductive component, and a diode which is reverse-biased with regard to load current being arranged in parallel with the current sensor.

2. A circuit arrangement as claimed in claim 1, further comprising a gate series resistor connected in series with the gate of the field-effect transistor, and a diode is connected in parallel with the gate series resistor and reverse-biased with regard to a voltage which effects a voltage drop across the gate series resistor and switches the field-effect transistor on.

3. A circuit arrangement as claimed in claim 1, further comprising:

a Zener diode which is reverse-biased with regard to a voltage which switches the field-effect transistor on being arranged between the collector of the second transistor and the source of the field-effect transistor.

4. A circuit arrangement as claimed in claim 1, further comprising:

a switch switchable between first and second positions, said first position connected between the supply voltage source and said gate of said field-effect transistor, said second position connected between said gate of said field-effect transistor and an auxiliary potential.

5. A circuit arrangement as claimed in claim 1, further comprising:

a resistor in parallel with the drain-source path of the field-effect transistor.

6. A circuit arrangement as claimed in claim 1, further comprising:

a Zener diode which is reverse-biased for a supply current being in parallel with a series circuit formed by the current sensor and the drain-source path of the field-effect transistor.

7. A circuit arrangement as claimed in claim 1, wherein said inductor is of an inductance such that when the circuit arrangement in a passive state is turned on, a main component of a charging current of parasitic capacitances of the field-effect transistor flows via the emitter-collector path of the second transistor.

8. A circuit arrangement as claimed in claim 1, wherein said resistive component of the current sensor is such that a load current, in connection with a threshold voltage of the transistor, is limited to a predetermined value.

9. A circuit arrangement as claimed in claim 1, wherein the resistor connected to the base of the second transistor is of a resistance which is small enough as regards charging of parasitic capacitances of the field-effect transistor and large enough as regards protection of the transistor against overloading.

10. A circuit arrangement as claimed in claim 1, wherein the resistive component of the current sensor is formed by winding resistance of the inductor.

* * * * *